United States Patent [19]

Hicks et al.

[11] Patent Number: 4,731,622

[45] Date of Patent: Mar. 15, 1988

[54] MULTIPLE INFORMATION ARRAY REGISTRATION APPARATUS AND METHOD

[75] Inventors: Anthony B. Hicks; Jerome L. Johnson, both of Irvine; Charles H. Morris, II, Anaheim, all of Calif.

[73] Assignee: Sanders Associates Inc., Nashua, N.H.

[21] Appl. No.: 787,874

[22] Filed: Oct. 16, 1985

[51] Int. Cl.$^4$ ............................................. G01D 15/10
[52] U.S. Cl. .................................... 346/157; 346/154
[58] Field of Search ................ 346/154, 157; 364/318, 364/314; 400/114; 101/DIG. 13; 358/300; 355/4

[56] References Cited

U.S. PATENT DOCUMENTS 4,007,489  2/1977  Helmberger et al. ................ 346/157

*Primary Examiner*—Arthur G. Evans
*Attorney, Agent, or Firm*—Wm. F. Porter, Jr,

[57] ABSTRACT

A multicolor electrostatic plotter is disclosed and includes an image head for imparting a charge pattern to a web medium to be imprinted and a plurality of toner means associated with different colors in which different colors are successively applied to portions of the medium by repeatedly driving and rewinding a portion of the medium past the image head and the plurality of toner means for charge and toner application to imprint multiple color rasterized images on the medium by the use of electronic circuitry which imprints a reference track on the medium during the first color pass and then optoelectronically detects deviations, generally perpendicular to the directional movement of the medium, of the medium during successive color passes substantially instantaneously with the deviations and which electronically adjusts the input data from a remote rasterizer by an amount equal to the substantially instantaneous offset so that lines of raster data are shifted by an amount substantially equal to the instantaneous displacement of the medium prior to charging the particular electrodes on the image head corresponding to the charge patterns for the next successive particular lines of raster information which are to be imprinted for the particular color image.

23 Claims, 11 Drawing Figures

| ADDRESS | 0 | 1 | 2 | 3 | 4 | 5 | 6 | 7 |
|---|---|---|---|---|---|---|---|---|
| 0 | | $LM_{12}$ | $LM_{13}$ | $LM_{14}$ | $LM_{15}$ | $LM_0$ | $LM_1$ | $LM_2$ | $LM_3$ |
| 1 | | $LM_4$ | $LM_5$ | $LM_6$ | $LM_7$ | $LM_8$ | $LM_9$ | $LM_{10}$ | $LM_{11}$ |
| 2 | | $R_{12}$ | $R_{13}$ | $R_{14}$ | $R_{15}$ | $R_0$ | $R_1$ | $R_2$ | $R_3$ |
| 3 | | $R_{18}$ | $R_{19}$ | $R_{20}$ | $R_{21}$ | $R_8$ | $R_9$ | $R_{10}$ | $R_{11}$ |
| N-2 | | $R_{N-4}$ | $R_{N-5}$ | $R_{N-6}$ | $R_{N-7}$ | $R_{N-0}$ | $R_{N-1}$ | $R_{N-2}$ | $R_{N-3}$ |
| N-1 | | $RM_{12}$ | $RM_{13}$ | $RM_{14}$ | $RM_{15}$ | $RM_0$ | $RM_1$ | $RM_2$ | $RM_3$ |
| N | | $RM_{20}$ | $RM_{21}$ | $RM_{22}$ | $RM_{23}$ | $RM_8$ | $RM_9$ | $RM_{10}$ | $RM_{11}$ |

OUTPUT BUFFER (214)

| ADDRESS | 0 | 1 | 2 | 3 | 4 | 5 | 6 | 7 |
|---|---|---|---|---|---|---|---|---|
| 0 | $LM_0$ | $LM_1$ | $LM_2$ | $LM_3$ | $LM_4$ | $LM_5$ | $LM_6$ | $LM_7$ |
| 1 | $LM_8$ | $LM_9$ | $LM_{10}$ | $LM_{11}$ | $LM_{12}$ | $LM_{13}$ | $LM_{14}$ | $LM_{15}$ |
| 2 | $R_0$ | $R_1$ | $R_2$ | $R_3$ | $R_4$ | $R_5$ | $R_6$ | $R_7$ |
| 3 | $R_8$ | $R_9$ | $R_{10}$ | $R_{11}$ | $R_{12}$ | $R_{13}$ | $R_{14}$ | $R_{15}$ |
| N-2 | $R_{N-0}$ | $R_{N-1}$ | $R_{N-2}$ | $R_{N-3}$ | $R_{N-4}$ | $R_{N-5}$ | $R_{N-6}$ | $R_{N-7}$ |
| N-1 | $RM_0$ | $RM_1$ | $RM_2$ | $RM_3$ | $RM_4$ | $RM_5$ | $RM_6$ | $RM_7$ |
| N | $RM_8$ | $RM_9$ | $RM_{10}$ | $RM_{11}$ | $RM_{12}$ | $RM_{13}$ | $RM_{14}$ | $RM_{15}$ |

INPUT BUFFER (168)

$LM_N$ = LEFT MARGIN
$RM_N$ = RIGHT MARGIN
$R_N$ = RASTER DATA BITS

FIG. 8

MULTIPLE INFORMATION ARRAY REGISTRATION APPARATUS AND METHOD

BACKGROUND OF THE INVENTION

The present invention relates generally to methods and apparatus for correctly registering a plurality of arrays of information upon or in a medium as at least one of the medium and means for imparting the arrays is moved in one direction with respect to the other.

More particularly, the present invention is directed to the provision of a registration apparatus and a method for multi-color electrostatic plotters.

Electrostatic plotters typically produce visible images on paper or film by imprinting an invisible electrostatic charge pattern on the paper, film or other medium and then making the latent image visible by developing it with an appropriate colored ink. The electrostatic image is a series of small dots impressed across the width of the medium at up to 400 dots per inch by an electrostatic image head which contains a plurality of electrodes which are appropriately charged (or not) to provide the desired pattern for the row of electrostatic information desired to be printed.

As is shown in the attached FIG. 1, such an image head, generally designated 10, may be provided with a linear array of spaced electrodes, including for each image row desired to be printed an odd row, generally designated 12, and an even row, generally designated 14, of electrodes which preferably are each 0.0027 inches in diameter spaced on 0.0050 inch centers between electrodes in a given even or odd row and thus, 0.0025 inch between adjacent dots in adjacent odd and even rows).

Electrostatic color plotters may be configured to produce a relatively large number of colors by sequential overlay of, typically, four separate color planes (see FIG. 2) in a similar manner as that used in offset printing of magazines. Combinations of yellow, magenta, cyan, and black inks may be effectively combined to produce a full spectrum of colors.

As is shown diagrammatically in side elevation in FIG. 2, such an electrostatic plotter, generally designated 20, includes a supply roll 22 from which a sheet of paper, film or other medium 24 on which an image is to be printed is unwound by the action of a drive roll 26 which is driven by appropriate control circuitry and mechanisms within the system control, generally designated 28. After leaving the drive roll 26, the paper is collected on a take-up roll 32 which is also controlled by the system control 28.

As the medium 24 is pulled from the supply roll 22, it passes over an image head 34 with which it is kept in contact by a pressure roller 36 disposed between two guide or idler rollers 38. The image head 34 (which is configured as is shown for the image head 10 in FIG. 1) imparts charge pattern in a predetermined manner to the medium 24 in accordance with signals received from circuitry in the system control 28 and in accordance with plot data received via plot data lines shown as 40 corresponding to the raster color planes 42. The medium 24 so charged then comes into contact with the operative surface of one of a plurality of toning heads 44, 46, 48 and 50 for the application of toner of the appropriate color corresponding to the desired image pattern sought to be produced.

Each toner head, for example toner head 44, is associated with a reservoir of toner (not shown) which contains the appropriate color toner suspended in a liquid carrier, and similar reservoirs which are associated with each of the other toner heads contain similarly suspended toner for different ones of the primary colors used in the printing process. The appropriate toner is circulated by a pump (not shown) under the control of system control 28 through a conduit and the plurality of orifices (not shown) in a well-known manner to channels in the surface such as surface 44a of the toner head 44. The appropriate toner for the toner head flows over the toning surface of the head and then returns to its respective reservoir by way of the conduit and the channels in the toner head.

When the medium 24 passes over the appropriate toner head, it comes into contact with the carrier and the suspended toner, and the toners adhere selectively to charged portions of the medium 24 to form a color pattern corresponding to the charge pattern deposited by the electrodes on the image head 34.

Each of the toner heads 44, 46, 48 and 50 is provided with a vacuum conduit adjacent the right hand (as shown) portion thereof for removal of excess toner, and the plotter 20 is further provided (as is described in more detail in co-pending U.S. patent application No. 777,152, filed Sept. 18, 1985, in the name of Brian C. Preston, assigned to the Assignee of the present invention and entitled "Vacuum Toner Removal") with a separately actuable vacuum knife 52 which may be raised into position after the medium 24 is passed over the appropriate one of the toner heads 44, 46, 48 or 50 to remove any excess toner which may remain at or have migrated beyond the end of the plot. The details of said co-pending application are hereby incorporated herein by reference.

Such electrostatic color plotters use a multiple rewind method for the four color planes. Following the completion of each color plot, a clutch mechanism on the drive roll 26 (as is more fully described in U.S. patent application No. 756,547, filed July 19, 1985 now U.S. Pat. No. 4,621,535, in the names of Brian C. Preston and Bruce A. Bronson, assigned to the Assignee of the present invention and entitled "Forward Engagement and Reverse Disengagement Device") is disengaged, and the take-up roll 32, drive roll 26 and supply roll 22 are rewound so that the medium 24 may be returned to its initial position (by the system control 28) for successive passes for imaging of the additional color planes. The details of this latter application are hereby incorporated herein by reference. Such a multiple pass approach minimizes the number of image heads required, since each color plane uses the same image head with a different developer.

In the prior art, such as is disclosed in U.S. Pat. No. 4,500,045, issued to Whitaker et al on Feb. 19, 1985, registration of the color planes was accomplished with relatively complex, multiple mechanical servo-mechanisms to move the paper web medium 24 and/or the image head 34 for proper alignment of sequential color planes as they were being printed.

As is shown diagrammatically in FIG. 3, such prior art electrostatic color plotters registration mechanisms are provided with edge sensors 60 and 62 for substantially continually detecting the position of one edge (or a reference track, such as a longitudinal line generally in the longitudinal direction movement of the medium, and a plurality of shorter lines -"tracks"- spaced at predetermined intervals perpendicular to the longer longitudinal reference line) adjacent the supply roll 64 and the take-up roll 66, respectively.

The analog outputs of the edge sensors 60 and 62 are transmitted to amplifiers 68 and 70, respectively, and converted to digital signals in order to actuate step motors 72 and 74, respectively, which in turn physically laterally move the supply roll 64 and take-up roll 66, respectively, in accordance with movements of the edge of the medium or reference line detected by the edge sensors 60 and 62, respectively, in order to adjust for shifting or misalignment. The amount of movement of the edges or reference lines, the supply roll 64 and take-up roll 66 were fed back, respectively, via lines 76 and 78 to the edge sensors 60 and 62.

Similarly, prior art electrostatic color plotters, such as disclosed by Whitaker et al, were provided with a pair of line sensors 80 and 82 to detect the position of corresponding reference tracks on opposite sides of the medium and outputs corresponding to the positions of the tracks are transmitted to a differential amplifier 84 which converts the input signals from the sensor signals 80 and 82 into digital form, amplifying the difference and actuating a step motor 86 to move the image head 88 to compensate for differences in the reference tracks adjacent the image area in the direction of longitudinal movement caused, for example, by expansion or contraction of the paper or other medium as a result of stretching or of temperature or humidity changes during successive passes of the medium over the toner head. The position of at least one detected reference track is fed back via line 90 to the input of one of the line sensors 80 and 82.

Thus the prior art provided supply roll and take-up roll servo-mechanisms which kept the entering and exiting web or medium within coarse tracking. Precision alignment of the image planes was accomplished by the use of yet another servo-mechanism moving the image head to follow the reference tracks placed on the web during the printing of the first color plane. Each subsequent color plane was aligned to the initial plane by following the reference tracks placed on the medium during printing of the initial color plane.

Such a prior art electro-mechanical registration technique is mechanically and electronically complex and expensive, provides only relatively coarse adjustments for the longitudinal lateral displacement of the web during successive image passes and is affected by an extremely complex series of mechanical mechanisms which must constantly be kept in adjustment. In web offset presses, for example, accuracy can be achieved only through precision mechanical alignment of the printing elements and manual adjustment procedures at the start of each multicolor imaging process. Such techniques are not advantageously suited to plotters of the computer graphics type.

Accordingly, it is an object of the present invention to provide for correct registration of a plurality of patterns of information on or within a medium—for example, multicolor images on a paper web, in an extremely simple, reliable, easily attainable and efficient manner.

Another object of the present invention is to provide multiple color imaging with the correct registration of successive image planes imprinted on a medium by the use of relatively high speed, inexpensive electronic techniques, rather than the relatively complex, mechanical prior art mechanisms which require constant adjustment.

SUMMARY OF THE INVENTION

The foregoing and other objects of the invention are achieved in a multicolor electrostatic plotter including an image head for imparting a charge pattern to a web medium to be imprinted and a plurality of toner means associated with different colors in which different colors are successively applied to portions of the medium by repeatedly driving and rewinding a portion of the medium past the image head and the plurality of toner means for charge and toner application to imprint multiple color rasterized images on the medium by the use of electronic circuitry which imprints a reference track on the medium during the first color pass and then optoelectronically detects deviations, in a direction generally perpendicular to the directional of longitudinal movement of the medium, of the medium during successive color passes substantially instantaneously with the deviations and which electronically adjusts the input data from a remote rasterizer by an amount equal to the substantially instantaneous offset so that lines of raster data are shifted by an amount substantially equal to the substantially instantaneous displacement of the medium (in the direction generally perpendicular to the direction of the medium movement) prior to charging the particular electrodes on the image head corresponding to the charge patterns for the next successive particular lines of raster information which are to be imprinted for the particular color image.

In accordance with one embodiment of the invention, an imaging device includes multiple recording means for imparting at least first and second patterns of indicia on a medium as at least one of the medium and recording means is moved in one direction with respect to the other in at least one pass. The imaging device includes correction means, associated with and stationary with respect to the recording means, for correcting for medium displacement in a direction generally perpendicular to the one direction of movement of the medium during the at least one pass so that the first and second patterns are substantially correctly registered with respect to each other on the medium.

In the particular embodiment of commercial interest to the assignee of the present invention, an electrostatic color plotter, having a single image head and a plurality of toner heads and, therefore, operating in a multiple, successive pass and rewind operating mode to produce multiple color images on paper or other web media, imprints a reference track on the medium or web media during the first color pass. A charge coupled device (CCD) array substantially continuously detects the position of the reference track during successive passes for other colors and transmits signals representative of the offset from the first pass to dot shift logic circuitry which includes a memory device and dot position logic circuitry. The dot shift logic circuitry is substantially, instantaneously responsive to transmitted changes in offset of the reference track during successive passes of the media to shift incoming raster data (from a remote rasterizer) which is stored in an input buffer by the amount of offset detected by the charge couple device (CCD) array during transfer of the stored raster information from the input buffer to an output memory buffer so that the information in the output memory buffer is appropriately shifted by the correct amount from that stored in the input buffer prior to reading out the information stored in the output memory buffer to hybrid circuits which apply the appropriate high voltage charges to the electrodes on an electrostatic image head for imparting the proper charge pattern for the line and color currently being imaged to the paper or other medium upon which the image is being imprinted.

The dot shift logic includes, in addition to the input buffer memory and output memory buffer, an input processor or CPU (preferably, a Motorola 68000 variety) and an output processor or CPU (also, preferably a Motorola 68000). The offset detected by the CCD array is stored in the output processor which computes an offset value which is then transmitted via the input buffer to the input processor which in turn controls the operation of a dot position counter and dot shift logic. Raster data from the remote rasterizer is transmitted from the remote controller to the input buffer under the control of the input CPU and then loaded in parallel in a 4-Deep FIFO and thereupon into a 16-to-1 multiplexer (MUX). The FIFO and multiplexer in combination define a parallel-to-serial converter.

The information stored in the 16-to-1 MUX is read out beginning at a point controlled by the dot position counter (which corresponds the the substantially instantaneous amount of computed offset value) in serial form to a shift register which separates the received data into odd dot row data and even dot row data which is stored in parallel in a 16-bit odd data shift register and a 16-bit even data shift register, respectively. After a total of 32 bits have been read into the shift register, the resulting two (odd and even) parallel 16-bit words are read into odd and even dot latches, respectively. The input processor has a destination port which transmits signals which initialize the odd and even latches or destination registers in output memory access logic (the access logic including the odd and even latches or destination registers, timing circuits and control circuits which sequence transfer of odd and even information) and permits reading of the separated and shifted odd and even row data from the output memory access logic to the output memory buffer. The output processor in the dot shift logic circuitry controls the transmittal of "shifted" odd and even data from the output memory buffer via the conventional hybrid circuits, which are connected to the system high voltage supply, to energize the appropriate electrodes in the odd and even rows on the image head for each line of raster data.

The appropriate charge patterns are then successively applied for shifted lines of odd and even data for the image area on the pass for that color until the imaging process for the particular color is completed as the charged media is pulled over the appropriate toner head.

The paper or other media is then rewound to its initial position and a similar sequence of shifting of lines of raster information is followed for the application of images with successive colored toners correctly registered with prior color images.

BRIEF DESCRIPTION OF THE DRAWINGS

These and other objects and features of the present invention will be more fully appreciated, when described in greater detail in the following specification, taken together with the drawings in which:

FIG. 8 is a view showing tabular representations of the input and output memory buffers illustrating the respective data positions of unaltered raster input data and of corresponding shifted output raster data.

DETAILED DESCRIPTION OF THE PREFERRED EMBODIMENT

Figure 2:
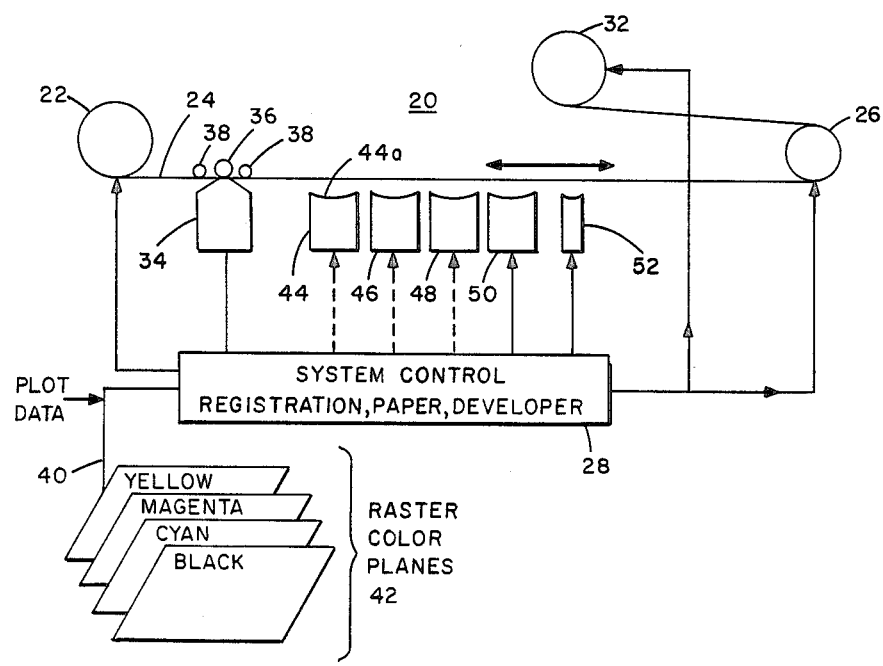
FIG. 2 is a partially diagrammatic view, in side elevation, of a multiple color electrostatic plotter.
Figure 3:
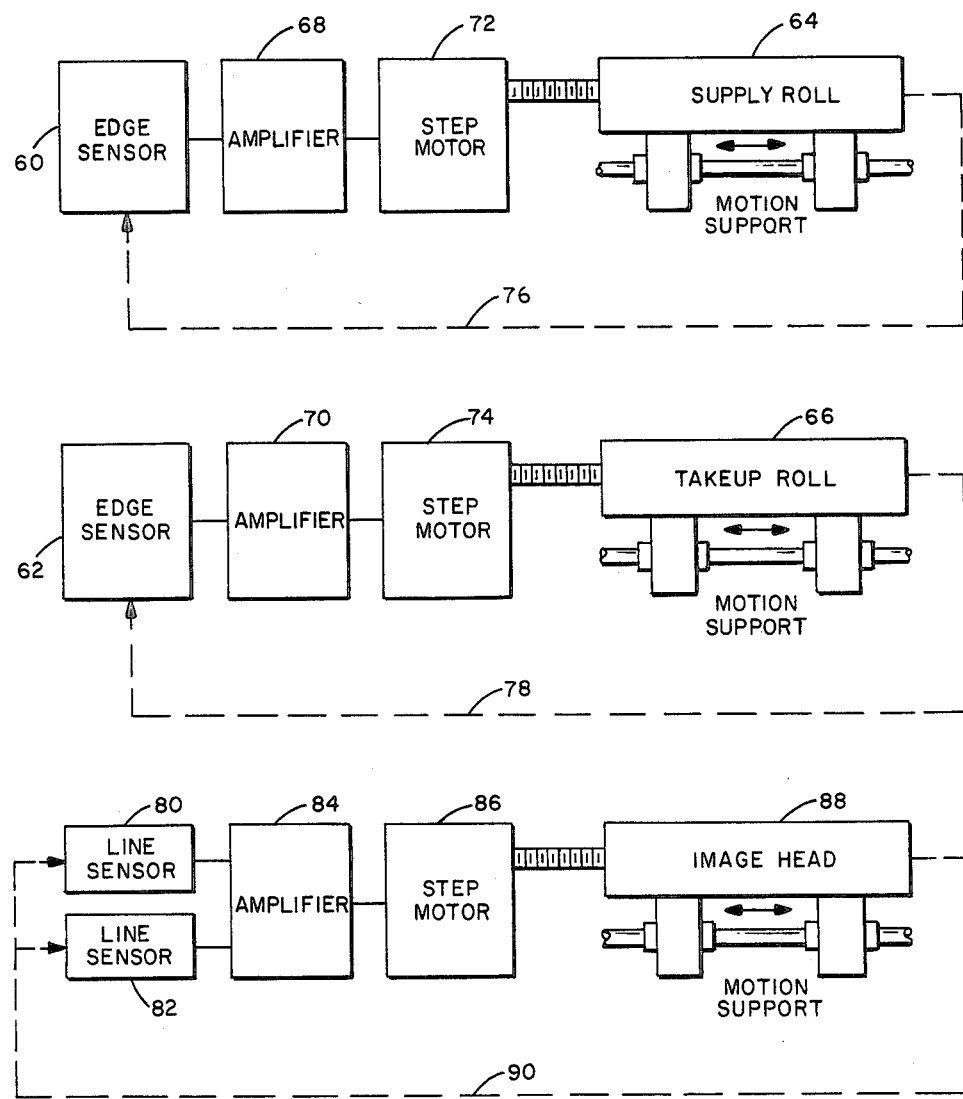
FIG. 3 is a diagrammatic view, in block diagram form, showing the operative portions of prior art electro-mechanical web registration on systems.
Figure 4:
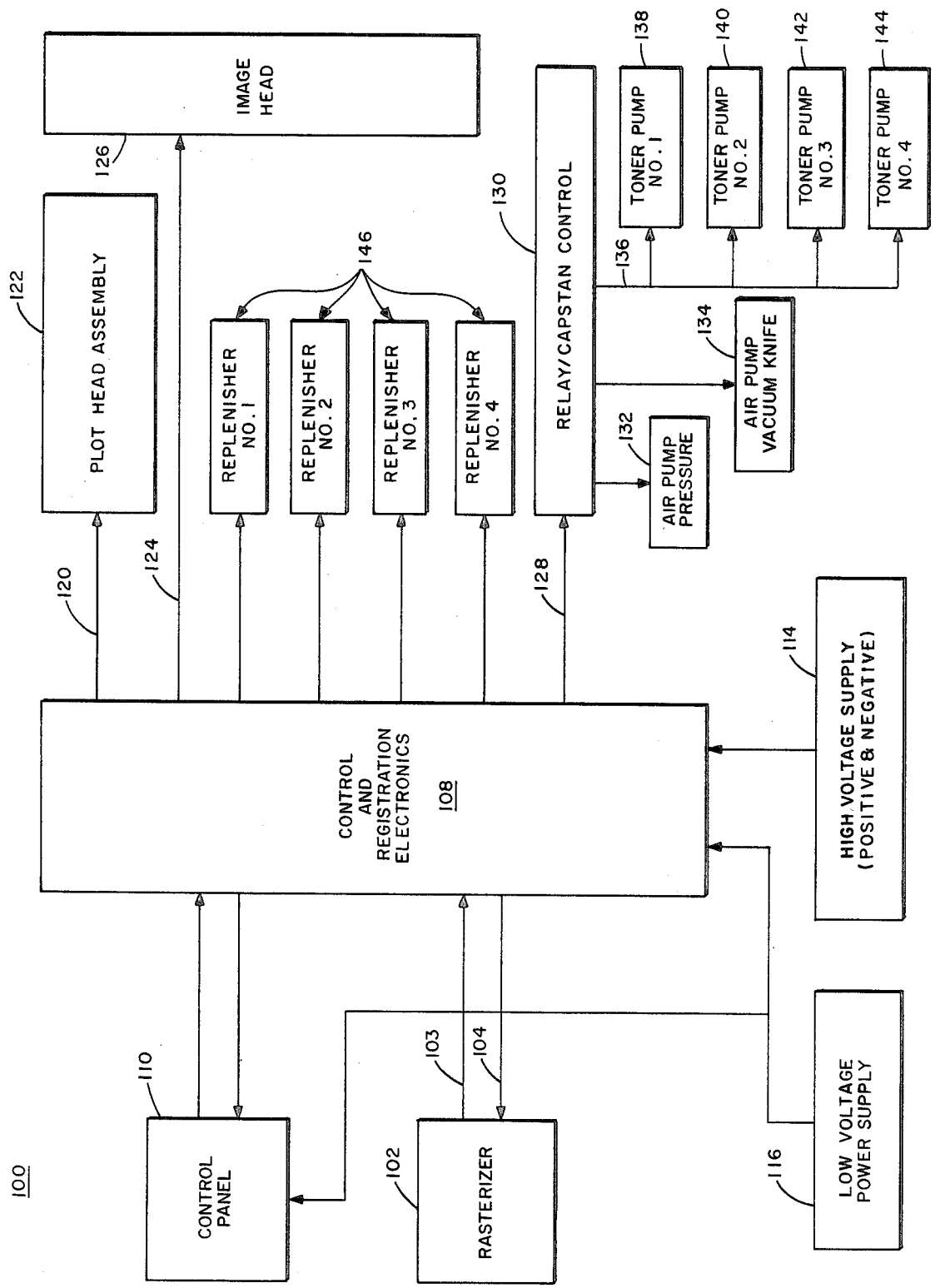
FIG. 4 is an overall block diagram of an electrostatic multi-color plotter constructed in accordance with the present invention.

A multicolor electrostatic plotter, generally designated 100 (which may be of the type generally described above with respect to FIG. 2) is shown in overall block diagram form in FIG. 4. The plotter 100 is connected to a remote rasterizer 102 via interface lines 103 and 104 (4 control, 8 data) which are connected to the plotter control and registration electronic circuitry 108. The rasterizer 102 includes a remote controller 105 (see FIG. 5) which transmits raster data to the electronics 108 and a DMA controller 106 which transmits rasterizer address information to the control and registration electronics 108. Certain additional control information (such as ODR and GDR signals which indicate, respectively, (1) requests from the control and registration electronics circuitry 108 for additional raster data or (2) a response from the remote controller 105 and the rasterizer 102 that a data request has been completed) also is transmitted over lines 103 and 104. The plotter 100 includes a control panel 110 which has a plurality of manually operated controls, such as on-off controls and displays, various diagnostic selection (such as stylus tests) switches and, as will be explained in greater detail below, has a factory set calibrated value of the odd or even pin number on the image head for which the plotter 100 is initially set to provide an initial (assumed) margin reference value for the dot shift logic circuitry.

The plotter 100 is provided with a conventional low voltage power supply 116 and high voltage power supplies 114 which provide excitation, under the control of the control and registration electronic circuitry 108, for the various functions performed by the plotter 100. As is shown, the control and registration electronics circuitry 108 controls, via a line 120 a conventional toner plot head assembly 122 which actuates, controls the particular one of a plurality of color toner heads which is to be used, controls (via a line 124) the energization of the image head 126 and controls (via a line 128) the relay/capstan control circuits 130.

The relay/capstan circuits 130 in turn control the actuation of an air pressure pump 132 for movement of the toner heads and of a vacuum pump 134 (for removal of excess toner adjacent each toner head and at the vacuum knife 52 (FIG. 2) at the end of each successive pass of paper over the image head 126 as is explained in greater detail in the "Vacuum Toner Removal" application referenced herein, and also controls the actuation (via a line 136) of the appropriate one of the toner pumps 138, 140, 142 or 144 for the color being imprinted on the paper web or the medium.

The control and registration electronics circuits 108 also controls the toner replenisher supplies, collectively designated 146 for each color toner, and, as will be explained in greater detail below, the shifting of the input raster data applied via the lines 124 to the electrodes on the image head 26 to correspond to the offset during web movement.

Figure 1:
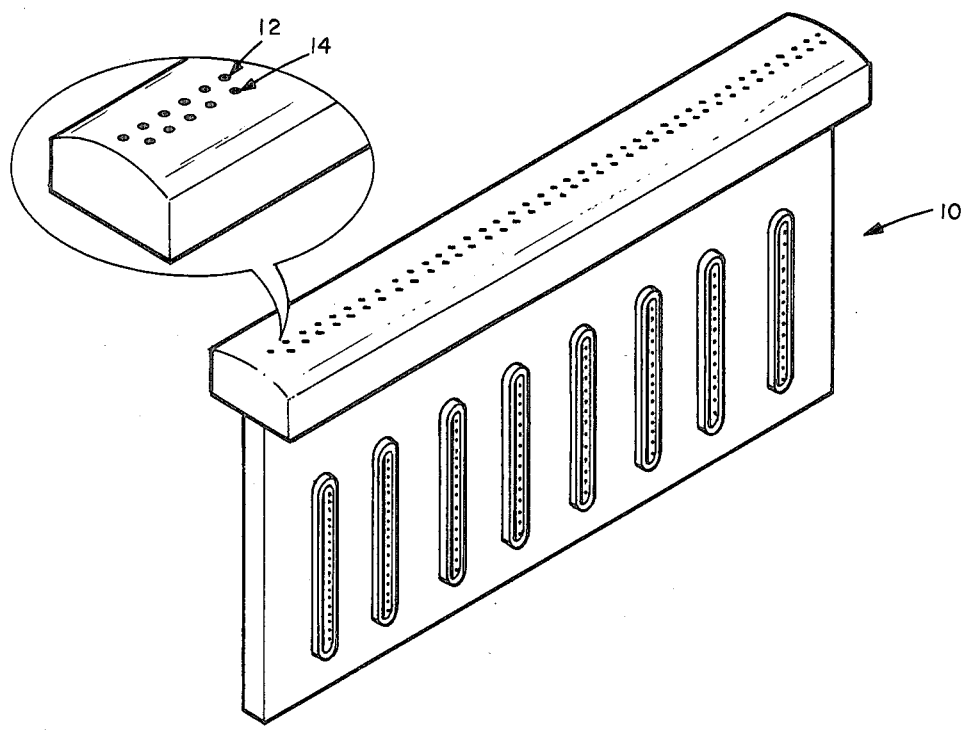
FIG. 1 is perspective view, with a portion magnified, of an electrostatic image head.
Figure 5:
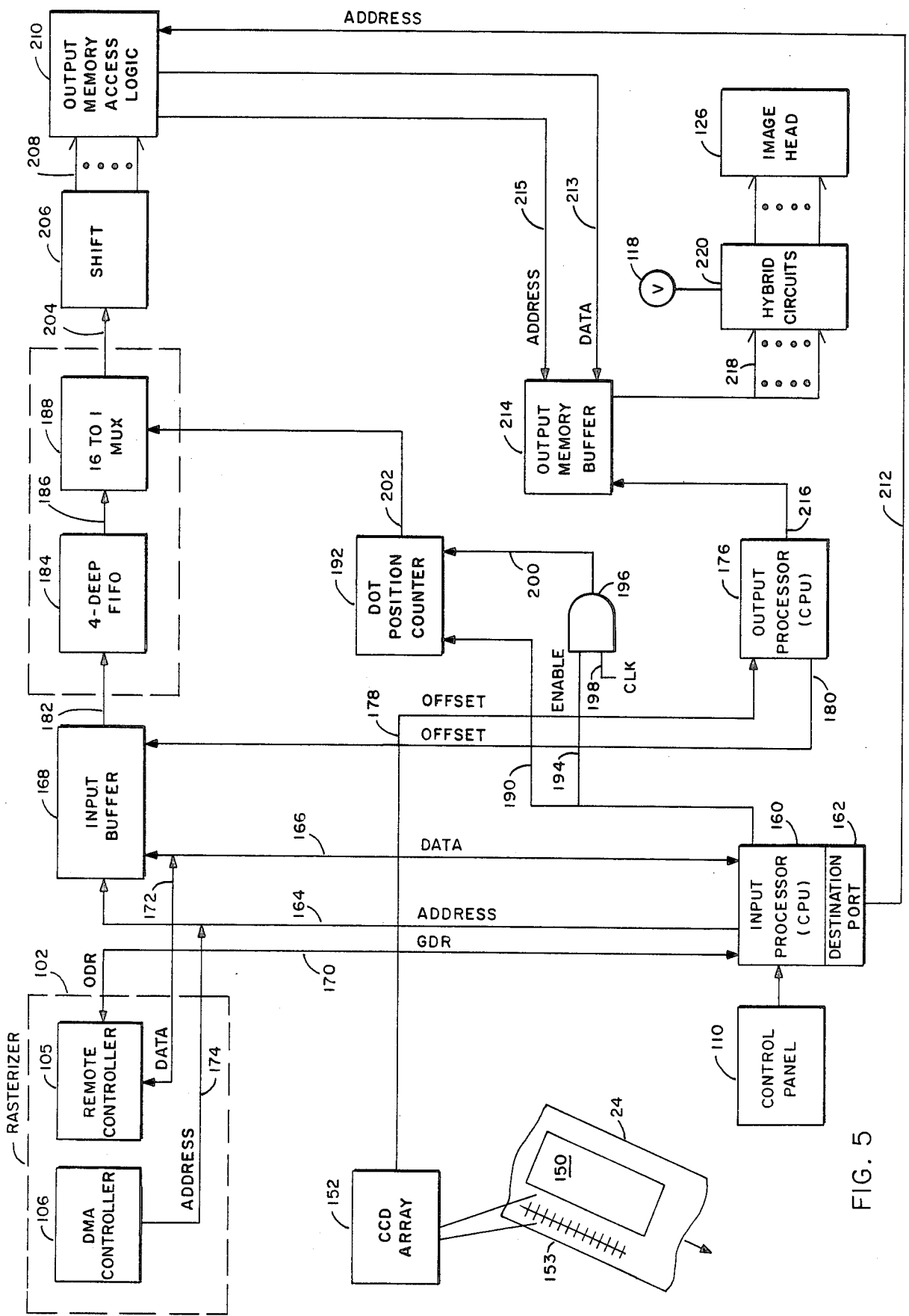
FIG. 5 is a simplified electrical schematic block diagram of an electronic registration control system for a color electrostatic plotter constructed in accordance with the present invention.
Figure 7:
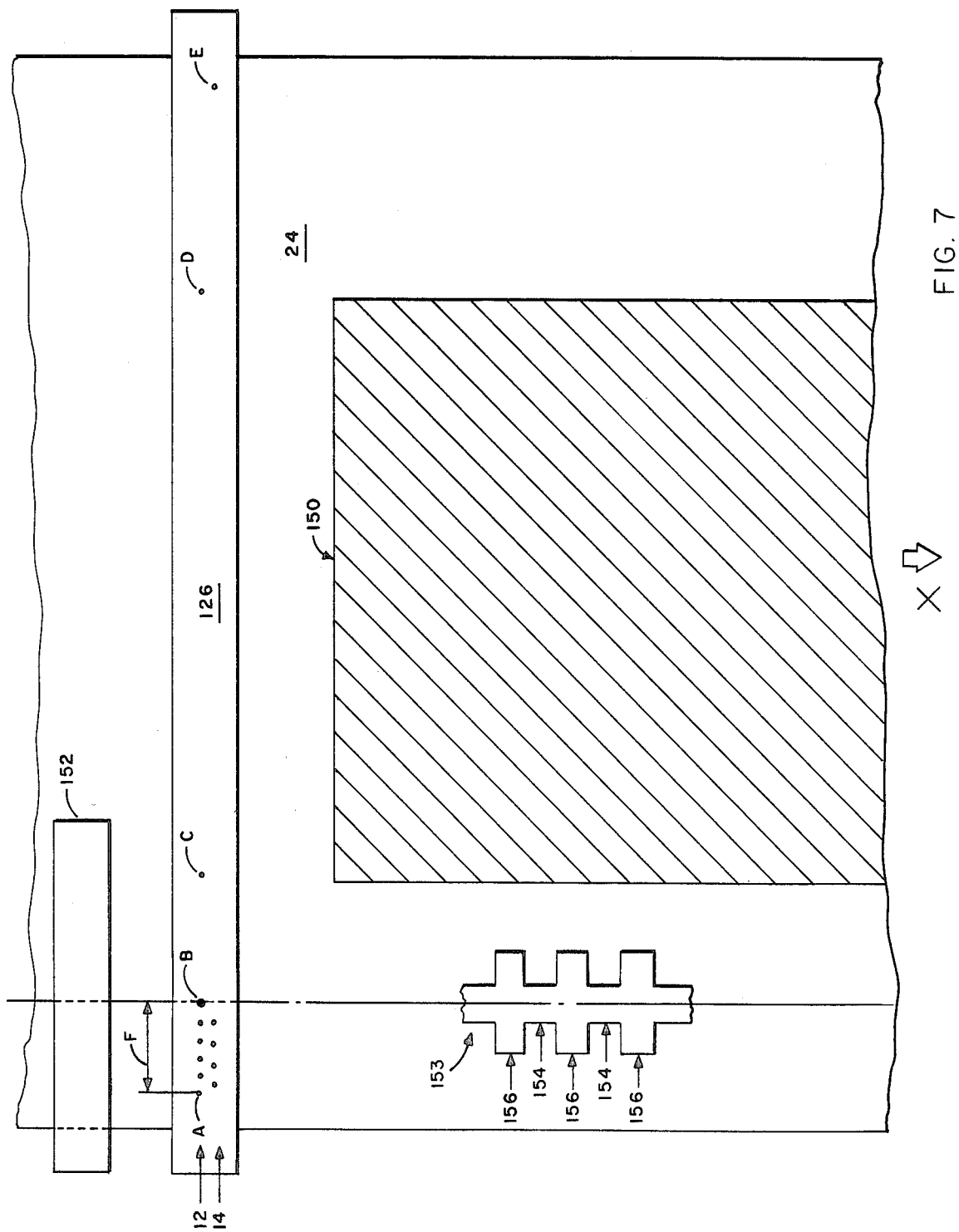
FIG. 7 is a partially diagrammatic view, in bottom elevation, showing portions of the medium being recorded on, the reference line and registration "tracks", the CCD array and the electrostatic image head utilized in connection with the present invention.

Referring now to FIGS. 5 and 7, the registration apparatus and method of the present invention will be explained in greater detail. FIG. 7 shows a bottom elevation of a nominal 36 inch image head 126 with a web medium 24 passing in the direction indicated by the arrow designated X over the image head 126. The electrodes (A-E) on the head 126 are shown in solid lines (rather than dotted) for simplicity and clarity of explanation. The medium 24 has a cross hatched image area designated 150 upon which is desired to imprint successive overlaid color images. The image head 126 has a plurality of electrodes in an odd row designated 12 and an even row designated 14 having the size and spacing as described above in connection with FIG. 1. The first pin (pin 1) in odd row 12 is designated A. It is assumed that the center line of the reference track to be imprinted during the first color pass is located at pin 43 (designated B) which is spaced a distance F (typically 0.105 inches) from pin 1. The image area (i.e., the area upon which it is desired to imprint successive images of different colors extends from pin 85 (designated C to pin 14,020 (designated D). The last pin in the even row 14 is pin 14,080 (designated E). A charge coupled device (CCD) array 152 is shown adjacent and spaced apart from the image head 126 and orientated so that the surface of the paper or medium 24 moving in the direction indicated as X must first pass over the CCD array 152 (which consists of a plurality—e.g., 256—of photosensitive elements which are arranged to vary their output when they detect a change in light levels on the paper by an amount of the change detected over the length of the array and to have an output signal of a magnitude corresponding to the amount of light level change detected) so that as the paper or other medium 24 is pulled from the supply roll 22 by the drive roller 26 in the direction of the imaging head 126 the portion of the margin area of paper corresponding to the image area 150 to be imaged must first pass over the CCD array prior to passing over the image head 126.

As can be seen on the left portion of the paper 24 in FIG. 7 a reference track (only a portion is shown) is plotted in black during the first pass of the paper over the image head and is centered around the pin 43 (designated B). During the first pass of the paper or other medium over the image head, pins 37-49 are fired for twelve lines, pins 25-61 are fired for the next twelve lines and the firing of pins 37-49 and 25-61 is alternated to define a reference track generally designated 153 with narrow portions designated 154 (corresponding to the filing of pins 37-49) and wider portions 156 (corresponding to the filing of pins 25-61) for at least the length of the image area 150 when the paper is moving in the direction X.

Referring now to FIG. 5 the medium 24, with an image area 150 and reference track 153 and CCD array 152 are shown diagrammatically. A simplified block diagram of the electronic registration circuitry is also shown and includes an input processor (CPU) 160, such as Motorola 68000, having a destination port 162, with an address bus 164 and a data bus 166 connected to an input buffer 168. The input processor 160 has a separate port connected via a line 170 to the remote controller 105 in the rasterizer 102 to permit generation of requests for data (ODR signals to the remote controller 105) and transfer of raster data signals sent (GDR) from remote controller 105 to the input processor 160. The remote controller 105 and DMA controller 106 in the rasterizer 102 have, respectively, a data bus 172 and an address bus 174 connected to the data bus 166 and address bus 164, respectively, between the input CPU 160 and the input buffer 168. The dot shift logic circuitry also includes an output processor (CPU) 176, preferably a Motorola 68000, which receives and stores the offset signal from the CCD array 152 (via a line 178) and transmits a calculated offset value (via a line 180) to the input buffer 168 and thereupon (via the data bus 166) to the input CPU 160. Data in the input buffer 168 is transmitted (via line 182) in parallel into a 4-Deep FIFO 184, and information stored in parallel in the FIFO 184 is transmitted via a line 186 to a 16-to-1 multiplexer 188.

The input CPU 160 transmits the computed offset value via line 190 to a dot position counter 192. When incoming raster data has been loaded from the input buffer 168 via the line 182 in parallel into the FIFO 184 under the control of the input CPU 160 the input CPU 160, transmits a shift enable signal via line 194 to one input of an AND gate 196 which has its other input 198 connected to a 16 Megahertz clock. Thus, the dot position counter 192 is enabled via the output 200 of the AND gate 196 at the 16 MHz clock rate to transmit the appropriate dot position counts via a line 202 to a pointer in the 16-to-1 MUX 188, thereby to control the point at which stored information in the 16-to-1 MUX is read out in serial form via a line 204 into a shift register 206 which then contains the shifted raster data from the remote controller 105 in the rasterizer 102 shifted as determined by the dot position counter 192 (in an amount equal to the computed offset value based on the offset detected by the CCD array 152). The serially shifted data stored in shift register 206 at a 16 MHz rate converted to parallel via lines 208 into output memory access logic circuitry 210.

The output logic access circuitry 210 includes (as will be explained in greater detail below) odd and even destination registers for odd and even bits, respectively of data, timing circuits for loading of even and odd data and control circuitry which sequences the loading of data corresponding to odd and even rows into the destination registers. The odd and even destination registers in the output memory access logic 210 are initialized by a signal from the destination port 162 of the input CPU 160 via a line 212 and, when a counter (described below) determines that the shifted odd and even data registers are full, the odd and even data bits are transmitted (via data lines 213) to and stored at addresses (transmitted via lines 215 from output memory access logic 210) in the output memory buffer 214 as determined by signals transmitted from the destination port 162 of the input CPU 160.

When 16 bits each of odd and even data have been stored in the output memory buffer 214 the output CPU 176 sends a signal via a line 216 which permits the output memory buffer 214 to transmit odd and even data in parallel via lines 218 to conventional hybrid circuits 220 which are powered by the high voltage supply 118 to energize (or "fire") the appropriate odd and even electrodes on the image head 126 to produce the desired charge pattern (with the appropriate data shift to compensate for the particular offset in the reference track 153 as detected by the CCD array 152 and the corresponding offset value computed by the output CPU 176) for superimposing a second color image for each line on a previously imaged color pattern for that line with the precise correction for misregistration caused by movement of the medium in a direction generally perpendicular to the longitudinal (X) direction of movement of the medium and thereby to provide a visibly accurate overlay of color images.

Figure 6:
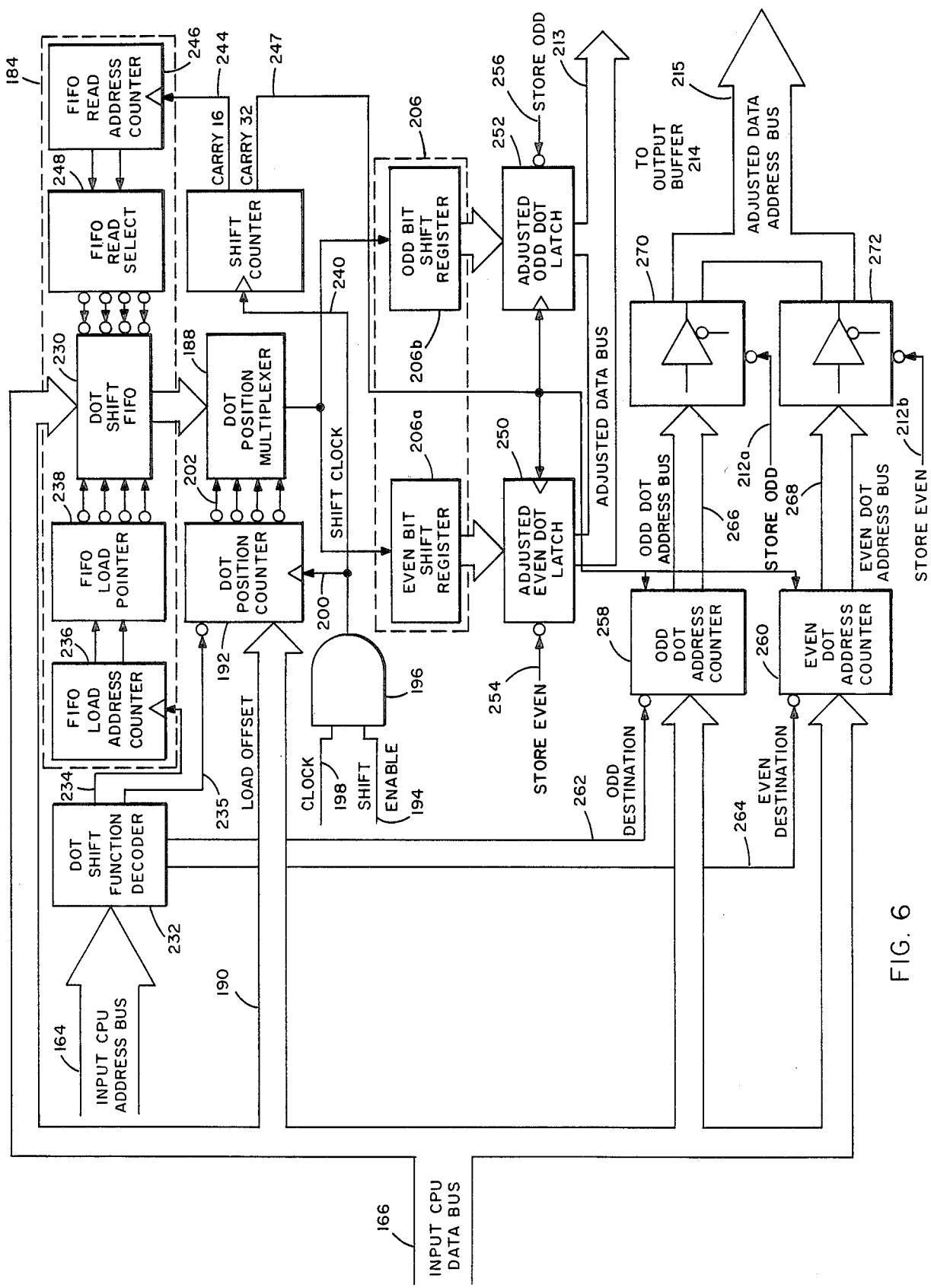
FIG. 6 is an electrical schematic block diagram showing the dot shift logic circuitry portion of the circuit shown in FIG. 5 in greater detail.

FIG. 6 shows slightly more detailed electrical schematic block diagram than FIG. 5, emphasizing the dot shift logic circuitry portion of the circuitry of FIG. 5.

Incoming data from the input buffer 168 is transferred via the input CPU data bus 166 to the 4-deep FIFO 184 which comprises a dot shift FIFO 230 which is four words (16 bits) deep. Loading of parallel data into the 4-deep FIFO is controlled by the input CPU address bus 164 which transmits a signal to a dot shift function decoder 232 which, in turn, transmits an output signal via a line 234 to step a FIFO load address counter 236 which actuates a FIFO load pointer 238.

The shift counter 242 has a "carry 16" output transmitted via a line 244 to a FIFO read address counter 246 which actuates a FIFO read select circuit 248 in the 4-deep FIFO 184 and permits the dot shift FIFO 230 to unload data into the dot position multiplexer 188. The first bit to be shifted and all subsequent contiguous bits shifted from the dot shift FIFO 230 and dot position multiplexer 188 fed to the input of the dot shift register 206. The selection of order of serialization is done by initializing and incrementing a dot selection counter 202 on the output of the dot position counter 192. The outputs of this counter 192 are tied to the selection inputs of the multiplexer 188. The selection outputs 202 point to the first bit and subsequent contiguous bits of the parallel word of raster dots which have been written from the dot shift FIFO 230, under the control of the read address counter 246 in FIFO read/select circuit 248, into the dot position multiplexer 188. Data is read out of the MUX 188 in serial format, beginning with the position determined by a pointer 202 at an output of the dot position counter 192 to the dot position multiplexer 188.

The information which is serially read out of the dot position multiplexer 188 is alternatively read into even and odd bit shift registers 206a and 206b, respectively, until sixteen bits each of even and odd information have been stored in the register 206a and 206b. At this point, the shift counter 242 has a "carry 32" output transmitted via a line 247 which loads adjusted even dot latch 250 and adjusted odd dot latch 252.

After every 32 shifts (16 even, 16 odd) of data bits, the resultant parallel words in the even and odd shift registers 206a and 206b are latched into the even and odd dot latches 250 and 252 by the "carry 32" output on line 247 from shift counter 242. The latched data is immediately transferred to the appropriate location in the output memory buffer 214 as specified by the odd and even address destination counters 258 and 260, as will be discussed in greater detail below. The information is enabled to be read out of the adjusted even and odd dot latches 250 and 252 via store even and store odd signals transmitted via lines 254 and 256, respectively, from the output CPU 176.

The output memory access logic circuitry 210 also includes the odd and even dot address counters 258 and 260 which are initialized by the data transferred on the input CPU data bus 166 enabled by odd and even destination signals (via line 262 from dot shift function decoder 232). The odd dot address counter 258 is now initialized with the starting address of the memory block in the output memory buffer 214 which will contain odd dot data, while the even dot address counter 260 is initialized with the starting address of the block in the output memory buffer 214 which will contain the even output data. The odd and even address counters 258 and 260 are incremented by each successive "carry 32" signal on line 247. The outputs of the odd and even address counters 258 and 260 are transmitted via odd dot address bus 266 and even dot address bus 268, respectively, via driver circuits 270 and 272, respectively, which permit the odd and even dot address information to be transmitted via an adjusted data address bus 215 upon receipt of the store odd and store even signals, transmitted via lines 212a and 212b, respectively, from the destination port 162 of the input CPU 160.

FIG. 8 shows corresponding information stored in a portion of the input buffer 168 and the corresponding portion of output memory buffer 214 (consisting of two 64K byte memories, separate ones of which may be loaded, while the other is being read out simultaneously under the control of arbitration logic) in which the calculated value of data offset corresponds to four bits of information (about 0.02 inch). As can readily be appreciated, the input information in the input buffer includes a preselected amount of margin information (in example illustrated, 16 bits of information for both the left and right margins) and N bits of information for the odd and even raster data. Assuming that the paper or the medium 24 has shifted by an amount corresponding to four image head electrodes to the right, the net results of the transmission of the information corresponding to detection of the movement of the center line of reference track 153 by the CCD array 152, calculation of the offset value by the output processor 176 and shifting of the information transmitted from the MUX 188 to the shift register 206, under the control of the dot position counter 192, and thereupon to the output memory buffer 214 has been to move the corresponding information four positions to the left. It will be readily appreciated that as a practical matter, as much margin information or storage capacity could be provided as is desired and/or is necessary for a particular application. In addition, in the particular embodiment in which the invention has been utilized, it has been found that, as a practical matter, of the order of two electrodes per 200 lines of raster information is the maximum shift that is normally required.

Figure 9A:
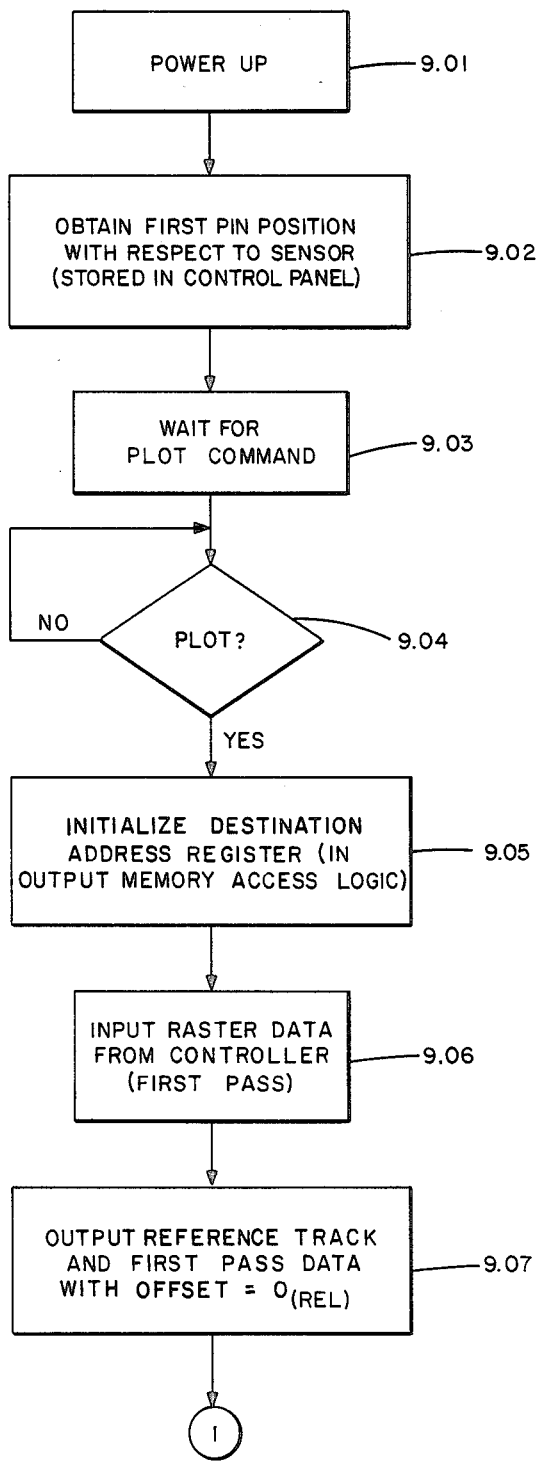
FIGS. 9A–9C comprise a block diagram, showing the progression of operations effected by the logic utilized in a multicolor electrostatic plotter incorporating electronic registration circuitry constructed in accordance with the present invention.
Figure 9B:
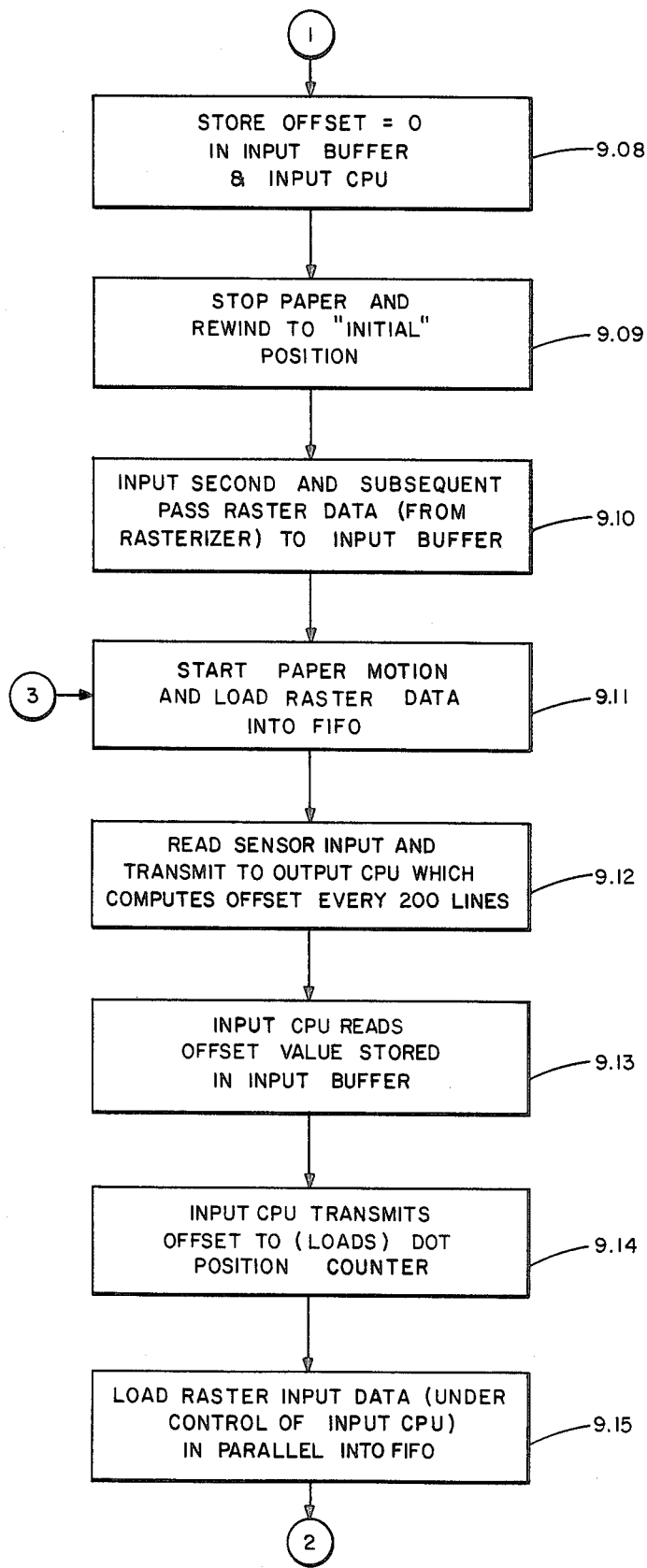
Figure 9C:
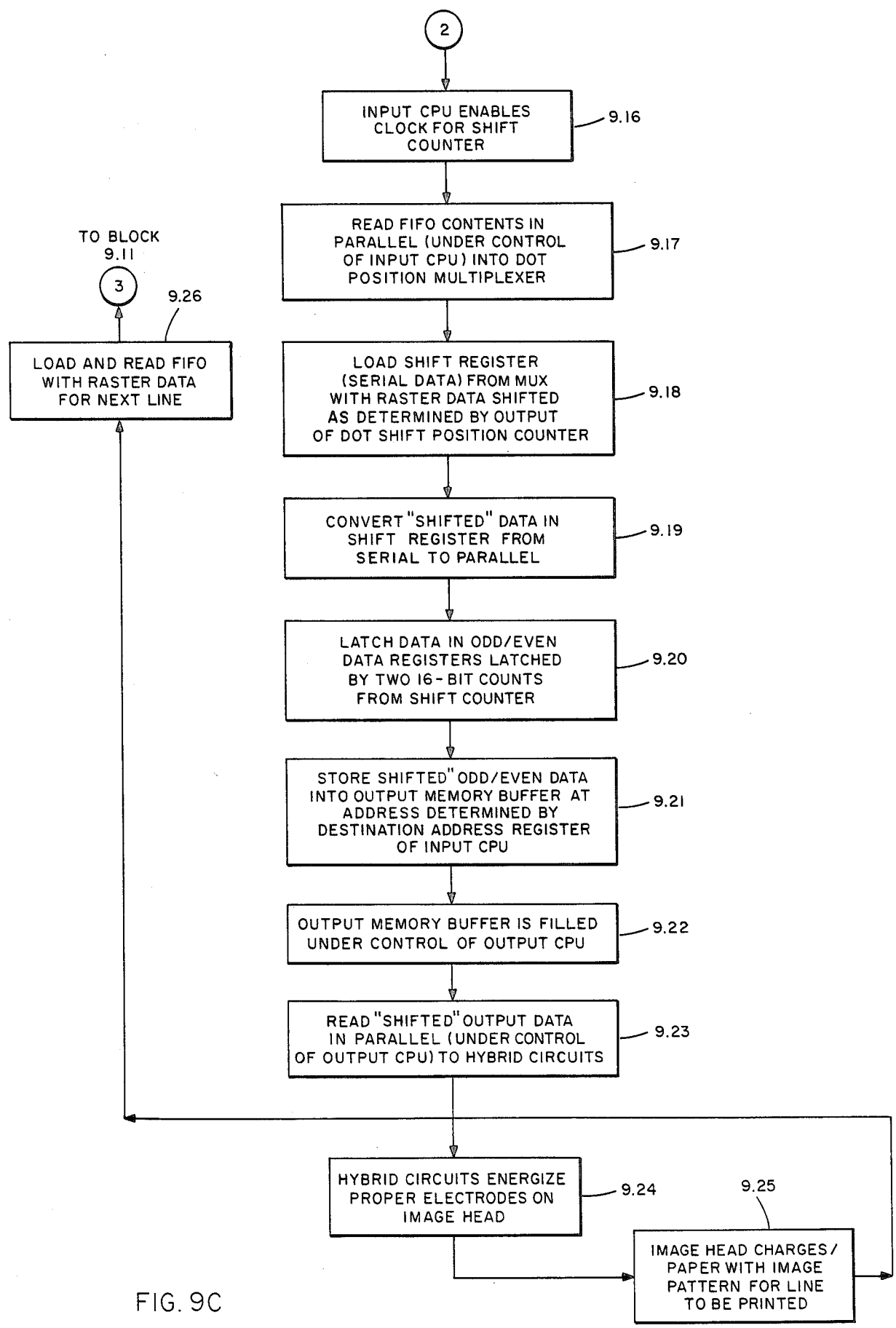

The logical flow of operations of a multi-color plotter constructed in accordance with the present invention will now be described with particular reference to FIGS. 9A–C.

At block 9.01, the power is turned on for energization of the appropriate high and low voltage and control circuitry to perform the multi-color imaging process.

The pin position for the first pass (which is preset at the factory in the control panel) with respect to the sensor is automatically read for the first pass by the medium 24. A block 9.03 the plotter apparatus waits for a plot command, and a block 9.04 logical decision is made in the remote controller 103 regarding whether or not a plot command has been given. If the plot command has not been given, the apparatus returns to block 9.03 to wait for a plot command. If the plot command has been given, then the destination address register 258 and 260 (in the output memory access logic 210) are initialized at block 9.05.

When the destination address register have been initialized, raster data for the first pass of the medium 24 is input in block 9.06 and reference track and first pass data applied to the medium 24 with the output from the CCD 152 for the offset value forced equal to zero (block 9.07). In block 9.08, the offset=0 is stored in the input buffer 168 and, therefore, into the input CPU 160 and the first pass continues with the application of the appropriate raster data for each line thereof by the image head 126 to the medium 24 prior to application of the appropriate toner from one of the toner heads 44, 46, 48 and 50. Following the conclusion of the first pass, as is explained in greater detail in copending application Ser. No. 777,152 entitled "Vacuum Toner Removal", the vacuum knife 52 is raised and the paper is advanced somewhat further to remove any excess toner left near the end of the plot (or which had migrated beyond the end of the plot) on the medium 24.

The paper is then rewound to its initial position in block 9.09, and second (or subsequent) pass raster data is input (block 9.10) from the rasterizer 102 to the input buffer 168. At block 9.11, the paper motion is started for the second (or subsequent) pass and raster data is loaded in serial form into the 4-deep FIFO 184 which converts the loaded data into sets of 16 parallel bits of stored information (4 words). The output of CCD array 152 is continuously read (at block 9.12) and is transmitted to the output CPU 176 which computes and offset value (in accordance with an algorithm which will be explained in greater detail below) every 200 lines of raster data. It will be readily appreciated that the computation of the offset value by the output CPU 176 can be affected substantially more or substantially less frequently than every 200 lines of raster data. However, it has been found in practical operation, that the computation of the offset value approximately every 200 lines of raster data provides more than sufficient correction for any misregisteration for subsequently applied layers of data so that it is not apparent to the human eye.

At block 9.13 the input CPU 160 reads the computed offset value which has been transmitted from the output processor 176 into storage in the input buffer 168, and at block 9.14 the input CPU 160 transmits the computer offset value to and loads that value into the dot position counter 192. Input raster data from the remote control 105 is loaded under the control of the input CPU parallel into the 4-deep FIFO 184 (block 9.15), the input CPU 160 transmits an enable signal via line 194 (See FIG. 5) to AND gate 196 to enable the dot position counter 192 (block 9.16).

At block 9.17, the contents of FIFO 184 are read in parallel, under the control of the input CPU 160, into the dot position multiplexer 188, and at block 9.18, the even and odd shift registers 206a and 206b are loaded with serial data from the multiplexer 188 with the odd and even raster data shifted as determined by the output of the dot shift position counter 192 which controls the pointer 202.

At block 9.19 the "shifted" data in the shift registers 206a and 206b is converted from serial to parallel form and the odd and even data (block 9.20) is latched into the adjusted odd and even dot latches 250 or 252 (see FIG. 6) by two 16 bit counts ("carry 32") from the shift counter 242.

At block 9.21, the "shifted" odd and even data is stored into the output memory buffer 214 at addresses determined by the destination address registers (controlling address counters 258 and 260) via outputs from the dot shift function decoder 232 which is controlled by signals from the destination port 162 of the input CPU 160. The transformation or the shifting of data is illustrated in one example by the representations of the input buffer 168 and output buffer 214 shown in FIG. 8. The output memory buffer 214 is filled under the control of the output CPU 176 at block 9.22, and at block 9.23, the "shifted" output data is read in parallel under the control of the output CPU 176 to the hybrid circuits 220. The hybrid circuits 220 energize (block 9.24) the proper electrodes on the image head 126 and (block 9.25) the image head 126 charges the medium 126 with the image pattern of the next line to be printed.

The medium 24 is appropriately charged for that line in the image area 150 and the appropriate color toner applied. Next at block 9.26, the next line of raster data is read from the remote controller 105 into the input buffer 168.

Following completion of the operation in block 9.26 the sequence of operations returns to block 9.11 and the paper motion continues for the next line of raster data while raster data continues to be read into the 4-deep FIFO 184. The data is shifted, as appropriate, during each color pass, until the pass is completed. The vacuum toner knife 52 is utilized to remove excess toner at the end of each pass, and the paper either (1) advances toward the take-up reel if the plot 32 has been completed or (2) rewound to its initial position if further passes are required to complete the plot.

It will be readily appreciated by those skilled in the art that X-direction positioning may, be achieved by the use of a suitable opto-electric encoder which includes a light source surrounded by a rotary member which rotates with (and, advantageously, may be rotated by) movement of the medium. The rotary member has fixed sets of numbers of apertures passing therethrough, each number in a set corresponding to the distance between raster scan lines. The opto-electrical detector senses the light as it is sequentially transmitted from the light source as the apertures in the rotary member are rotated thereby and responds by having an output to a counter, which in turn has an output to the control and logic circuits 108 and the output CPU 176 to control timing of the firing (application of the high voltage power supplies 114) to the electrodes on the image head 126.

After the initial color pass, as the medium 24 moves in the X-direction, the elements in the CCD array 152 sense the transitions between the wide track portions 156 and the narrow portions 154 of the reference track 153 and provide appropriate output signals to increment or decrement the count in the X-direction encoder counter to correct, in a known manner, for expansion or contraction of the medium 24 in the X-direction in subsequent passes.

The optical sensing elements in the CCD array 152 are spaced 0.001 inch apart and are in a known fixed, spatial relationship with respect to each of the electrodes (especially, electrode B, the factory-calibrated center-line value of the reference track 153). Accordingly, the variations of the outputs of the CCD array 152 transmitted via the line 178 to the output CPU 176 may be converted, through the use of any of a number of relatively simple, known algorithms to a calculated offset value (in terms of the required number of electrode dots by which output data must be shifted to correct for substantially instantaneous misregistration in the Y-direction—perpendicular to the direction of movement of the medium 24) which may then be transmitted to the input buffer 168, input CPU 160 and dot shift position counter 192 to effect the proper registration of multiple layers of colors on the medium 24.

It will also be readily appreciated by those skilled in the art that the invention has been described solely with reference to a currently preferred proposed commercial embodiment thereof in the form of an electrostatic multicolor plotting apparatus. Other embodiments of multiple information array registration apparatus and methods—by way of non-limiting examples—those including rigid or semi-rigid or flexible media, upon or into which information arrays are to be imaged, imparted or stored either in multiple passes or a single pass of one of the medium and one or more information storage/imparting/imaging devices, which may utilize any one or more of a variety of magnetic, electrical or optical array imparting techniques—may be implemented and utilized without departing from the spirit and scope of the appended claims.

Having thus described a preferred embodiment of our invention, we claim:

1. In an imaging device including multiple recording means, haing first and second sets of pluralities of circuit means for imparting each pattern of indicia on a medium, for imparting at least first and second patterns of indicia on a medium and the recording means is moved in one direction with respect to the other in at least two passes, the improvement comprising: correction means, associated with and stationary with respect to the recording means, for selectively and substantially continuously imparting reference indicia to the medium and separating electrical signals corresponding to detected indicia position and recombining the signals of individual ones of the first and second sets of pluralities of circuit means for correcting for medium displacement in a direction generally perpendicular to the one direction of movement of the medium during at least one pass, whereby the first and second patterns are substantially continuously correctly registered with respect to each other on the medium during substantially all of each pass subsequent to the first pass.

2. The imaging device of claim 1 wherein the first pattern of indicia is a first visible color and the second pattern of indicia is a second visible color.

3. The imaging device of claim 1 wherein the medium comprises a length of flexible web material.

4. The imaging device of claim 3 wherein the web material is a sheet of paper.

5. The imaging device of claim 1 wherein the recording means imparts reference indicia to the medium when the first pattern of indicia is imparted to the medium during a first pass and the correction means includes:

sensing means for sensing the amount of displacement of the reference indicia, in a direction generally perpendicular to the one direction of movement of the medium, from a reference value as the medium moves in the one direction during a second pass, and indicia correction means, responsive to the amount of displacement sensed by the sensing means, for correcting the second pattern of indicia to effect substantially correct registration on the medium with the first pattern of indicia.

6. The imaging device of claim 1 wherein the medium has reference indicia thereon and further comprising:

sensing means for sensing the amount of displacement of the reference indicia, in a direction generally perpendicular to the one direction of movement of the medium, from a reference value as the medium moves in the one direction during each pass, and indicia correction means, responsive to the amount of displacement sensed by the sensing means, for correcting the second pattern of indicia to effect substantially correct registration on the medium with the first pattern of indicia.

7. The imaging device of claim 6 wherein the reference indicia and the first and second patterns of indicia are visible indicia and the sensing means comprises an array of optical sensors.

8. The imaging device of claim 1 comprising a printing mechanism wherein the recording means comprises a print head including an array of printing elements for imparting the first and second patterns of visible indicia on the medium.

9. The printing mechanism of claim 8 wherein the print head is stationary.

10. The printing mechanism of claim 9 wherein the printing elements comprise at least one row of electrodes for imparting a pattern of charges to the medium.

11. The printing mechanism of claim 10 wherein the at least one row of electrodes has a length greater than the length of the longest pattern of indicia in the generally perpendicular direction.

12. The printing mechanism of claim 11 wherein the printing element comprises first and second rows of electrodes for each charge pattern to be imparted to the medium, all of the electrodes in the second row being positioned intermediate the electrodes in the first row and spaced apart in the one direction from the electrodes in the first row by a dimension which is greater than the diameter of the electrodes.

13. A method of imparting at least first and second patterns of visible indicia onto a medium by an imaging means, having first and second sets of pluralities of circuit means for imparting each pattern of indicia on the medium, the method comprising the steps of:

A. moving one of the medium and imaging means in one direction with respect to the other, B. imparting each of the patterns to the medium while moving one of the medium and imaging means, C. substantially continuously monitoring relative displacement of the imaging means and the medium in a direction generally perpendicular to the one direction while the patterns are imparted to the medium, and D. correcting, solely within the imaging means and by adjusting signals applied to both of the first and second sets of pluralities of curcuit means, for the relative displacement at least during imparting of the second pattern to the medium, whereby the first and second patterns are substantially continuously correctly registered with respect to each other on the medium during successive passes.

14. The method of claim 13 wherein both of the steps of monitoring relative displacement and compensating for the relative displacement are substantially continuous during imparting of at least the second pattern to the medium.

15. The method of claim 14 wherein the medium comprises a length of flexible web material, the first pattern of visible indicia is a first color, and the second pattern of visible indicia is a second color.

16. The method of claim 14 wherein the step of moving one of the medium and the imaging means in one direction with respect to the other comprises the steps of:
   moving the medium in the one direction, and
   maintaining the imaging means in a fixed position.

17. The method of claim 16 wherein the imaging means comprises a print head including an array of printing elements for imparting the first and second patterns of visible indicia on the medium.

18. The method of claim 17 wherein the printing elements comprise at least one row of electrodes for imparting a pattern of charges to the medium, and the row of electrodes has a length greater than the length of the longest pattern of the indicia in the generally perpendicular direction.

19. The method of claim 13 wherein the step of imparting each of the patterns on the medium comprises the steps of:
   imparting the first pattern on the medium while moving the medium from an initial position in the one direction with respect to the imaging means, returning the medium to the initial position after the first pattern is imparted, and subsequently imparting the second pattern on the medium while again moving the medium on the one direction from the initial position.

20. The method of claim 19 further comprising the step of:
   imparting reference indicia to the medium prior to imparting the second pattern on the medium, and wherein the steps of monitoring relative displacement and correcting therefor, respectively, comprise the steps of:
   substantially continuously sensing the displacement of the reference indicia from predetermined values during imparting of the second pattern, and
   substantially continuously correcting the pattern being imparted by the imaging means, without physically moving the imaging means, by an amount proportional to the substantially instantaneous displacement of the reference indicia during imparting of the second pattern.

21. The method of claim 20 wherein the reference indicia are visible and an optical sensor detects the displacement of the reference indicia from the predetermined values.

22. The method of claim 20 wherein the imaging means has a length in the generally perpendicular direction which is greater than the length of the longest pattern of indicia on the medium, and an operative portion which is less than the corresponding length of the medium, and the step of correcting, solely within the imaging means, comprises the step of:
   substantially continuously shifting at least the second pattern of visible indicia to be imprinted by continuously shifting the operative portion of the imaging means by a distance equal to the displacement of the reference indicia from the reference values.

23. The method of claim 22 wherein the imaging means comprises an image head having at least one row, which is longer than the length of the longest pattern of indicia on the medium, of electrodes which are energizable for imparting a predeterminable charge pattern to the medium and the step of shifting at least the second pattern comprises the step of:
   electrically altering the portion of the row of electrodes which is energizable for imparting the corrected charge pattern for at least the second pattern which is imparted to the medium.

* * * * *